May 1, 1934. E. MAYMAN 1,956,871
CALIPER ATTACHMENT FOR OUTSIDE MICROMETER CALIPERS
Filed Aug. 19, 1931

INVENTOR
EDWIN MAYMAN
BY A. B. Bowman
ATTORNEY

Patented May 1, 1934

1,956,871

UNITED STATES PATENT OFFICE 1,956,871

CALIPER ATTACHMENT FOR OUTSIDE MICROMETER CALIPERS

Edwin Mayman, San Diego, Calif.

Application August 19, 1931, Serial No. 557,962

10 Claims. (Cl. 33—167)

My invention relates to caliper attachments for outside micrometer calipers, and the objects of my invention are:

First, to provide a caliper attachment of this class by the means of which relatively small objects may be calipered either inside or outside and the measurements read from the inside micrometer caliper readings, and the outside likewise taken except that the thickness of the caliper nibs must be subtracted from the outside micrometer caliper readings.

Second, to provide an attachment of this class which may be readily secured in operative connection with the conventional outside micrometer caliper.

Third, to provide an attachment of this class, in which the calipers may be set and secured, and then the micrometer turned to engaging position therewith for taking the readings.

Fourth, to provide an attachment of this class, in which the caliper nibs may be quickly adjusted for either inside or outside readings.

Fifth, to provide an attachment of this class which is particularly adapted for small capacities such as one inch or less, particularly for small internal diameters or dimensions and odd shaped pieces.

Sixth, to provide an attachment of this class in which the caliper nibs are extended some distance from the side so that they are readily available for various purposes as desired; and Seventh, to provide an attachment of this class which is very simple and economical to manufacture, easy to apply, efficient in its action and which will not readily deteriorate or get out of order.

Figure 1:
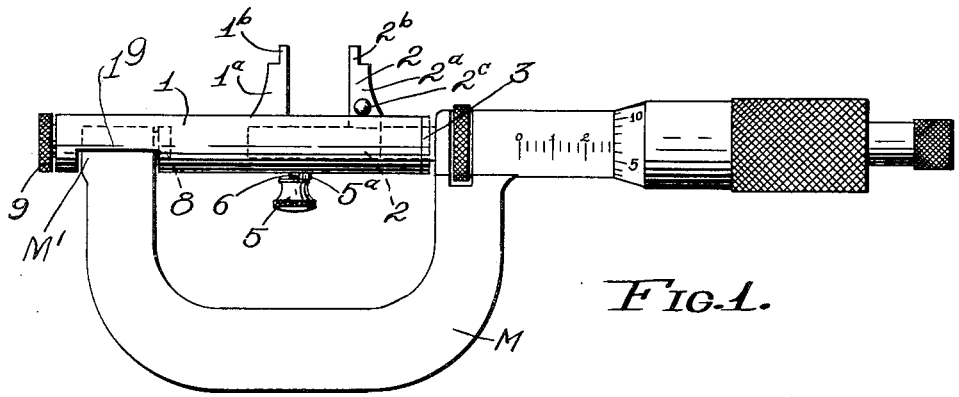
Figure 2:
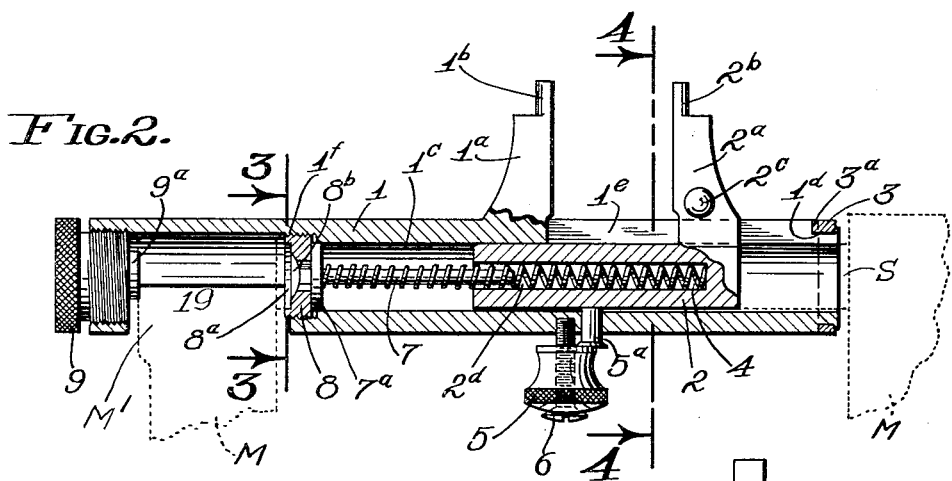
Figure 3:
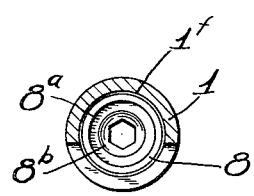
Figure 4:
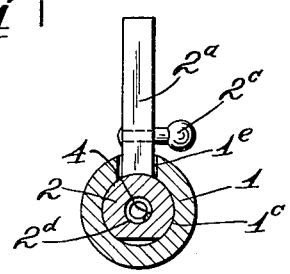

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, which form a part of this application, in which:

Figure 1 is a side elevational view of a conventional outside micrometer caliper with my attachment shown positioned in operative relation therewith; Fig. 2 is a fragmentary longitudinal sectional view of the attachment alone on an enlarged scale, showing certain parts and portions in elevation to facilitate the illustration, and showing by dotted lines engaging portions of the micrometer caliper; Fig. 3 is a transverse sectional view through 3—3 of Fig. 2; and Fig. 4 is another transverse sectional view through 4—4 of Fig. 2.

Similar characters of reference refer to similar parts and portions throughout the several views of the drawing.

The micrometer caliper M, sleeve 1, movable jaw plunger 2, collar 3, spring 4, lock nut 5, stud 6, spring guide 7, screw anvil 8 and clamp screw 9 constitute the principal parts and portions of my attachment.

The sleeve 1 is a hollow cylindrical sleeve member of the proper size and it is provided on one side with a fixed jaw 1a, which extends outwardly at one side thereof as shown best in Figs. 1 and 2 of the drawing. This fixed jaw is provided on its extended end with a reduced nib portion 1b. It is preferred to make this reduced portion exactly one-sixteenth of an inch thick to facilitate the subtraction calculation when using the caliper as an inside dimension caliper. This sleeve is provided with a bore 1c at one end in which is reciprocally mounted the body portion of the movable jaw plunger 2. This movable jaw plunger is provided on one side with a jaw member 2a which extends some distance through a slot 1e in the sleeve 1, and is provided with a reduced extended nib portion 2b similar to the extended nib portion 1b on the member 1. This jaw is also provided with a small lug 2c extending from one side thereof which is adapted to be engaged by the finger or thumb of the operator for moving the jaw member 2a together with the plunger 2 in the sleeve member 1 to facilitate the setting of the jaw member 2a relatively to the jaw member 1a.

The sleeve 1 is provided in its one end with a groove 1d in which is fitted a collar 3, which is preferably secured by beading the end of the sleeve against the outer side of the collar. This collar is provided with an extending key lug 3a which fits in the slot 1e shown best in Fig. 4 of the drawing, in which the jaw member 2a is adapted to reciprocate. This collar 3 prevents the caliper from extending too far by the action of the spring 4 when detached from the micrometer caliper and also serves as a reinforcement for the slotted end of the sleeve 1.

Mounted in the side of the sleeve is a stud 6, upon which is mounted a lock nut 5 which is adapted to engage a pin 5a, which extends through the wall of the sleeve, and is adapted to engage the body of the plunger 2 for holding it in any position that it is clamped by means of the members 5 and 5a and the stud 6.

The plunger body 2 is provided with a central bore 2d in which is mounted the one end of the spring 4. This spring extends outwardly from the end of the plunger body 2 and is guided by means of a spring guide 7 which extends into the bore 2d inside of the spring. This member 7 is provided with a head 7a on its one end and this head rests against the one side of the adjustable screw anvil 8 and fits the bore 1c. This screw anvil 8, it will be noted, is screwed into the sleeve in an enlarged threaded portion 1f, the side being flat against which the head 7a rests. The other side of this anvil member is provided with an annular groove 8a and with a concave portion 8b in which the anvil of the micrometer caliper rests, this device being so shaped that the attachment readily centers itself on the micrometer anvil. This anvil member 8 is provided centrally with a hexagon opening to receive a wrench to facilitate its adjustment. The end of the micrometer anvil is secured in adjusted position by means of a knurled clamp screw 9 which is screw threaded into the end of the sleeve 1, and is provided with a reduced portion 9a, which engages the micrometer frame M at the portion M', this micrometer portion M' being inserted in a socket 1g in one side of the sleeve 1.

The operation of the attachment is as follows:

The caliper attachment is secured in adjusted position with the outside micrometer caliper by inserting the portion M' of the frame of the micrometer in the socket 1g between the anvil 8 and the clamp screw 9, then positioning the spindle S in the opposite end of the sleeve giving the clamp screw a slight turn. It will be here noted that there is a slight clearance at the collar end of the sleeve to permit the insertions of the micrometer anvil into the recess 8a in the anvil 8. The attachment is secured in adjusted position with M' held between the anvil 8 and screw 9 and is operated by moving the plunger 2 which carries with it the movable jaw 2a to the position desired being a definite position with respect to the work for either inside or outside measurements, then locking the plunger by turning the lock nut 5 on the stud 6 which presses the pin 5a against the plunger and secures it, then turning the micrometer until its spindle engages the member 2, then calculating the size of the work from the micrometer reading.

The outside dimensions are measured between the jaws 1b and 2b in the usual manner but the thickness of the nibs must be subtracted from the actual micrometer reading. The inside dimensions are taken in the same way by simply taking the actual micrometer readings.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a device of the class described, a sleeve member provided with a socket in one side near one end adapted to receive a conventional micrometer frame end with its anvil and provided with a hole in the opposite end adapted to receive the spindle of said micrometer and further provided with a slot in one side, a fixed laterally extending jaw secured to said sleeve intermediate its ends, a plunger reciprocally mounted in said sleeve provided with a jaw similar to said fixed jaw on said sleeve extending outwardly through said slot and adapted to coact with said fixed jaw.

2. In a device of the class described, a sleeve member provided with a socket in one side near one end adapted to receive a conventional micrometer frame end with its anvil and provided with a hole in the opposite end adapted to receive the spindle of said micrometer and further provided with a slot in one side, a fixed laterally extending jaw secured to said sleeve intermediate its ends, a plunger reciprocally mounted in said sleeve provided with a jaw similar to said fixed jaw on said sleeve extending outwardly through said slot and adapted to coact with said fixed jaw, and resilient means tending to hold said plunger means outwardly in said sleeve.

3. In a device of the class described, a sleeve member provided with a socket in one side near one end adapted to receive a conventional micrometer frame end with its anvil and provided with a hole in the opposite end adapted to receive the spindle of said micrometer and further provided with a slot in one side, a fixed laterally extending jaw secured to said sleeve intermediate its ends, a plunger reciprocally mounted in said sleeve provided with a jaw similar to said fixed jaw on said sleeve extending outwardly through said slot and adapted to coact with said fixed jaw, and means for locking said plunger in certain relative positions in said sleeve.

4. In a device of the class described, a sleeve member provided with a socket in one side near one end adapted to receive a conventional micrometer frame end with its anvil and provided with a hole in the opposite end adapted to receive the spindle of said micrometer and further provided with a slot in one side, a fixed laterally extending jaw secured to said sleeve intermediate its ends, a plunger reciprocally mounted in said sleeve provided with a jaw similar to said fixed jaw on said sleeve extending outwardly through said slot and adapted to coact with said fixed jaw, resilient means tending to hold said plunger means outwardly in said sleeve, and means for locking said plunger in certain relative positions in said sleeve.

5. In a device of the class described, a sleeve member provided with a socket in one side near one end adapted to receive a conventional micrometer frame end with its anvil and provided with a hole in the opposite end adapted to receive the spindle of said micrometer and further provided with a slot in one side, a fixed laterally extending jaw secured to said sleeve intermediate its ends, a plunger reciprocally mounted in said sleeve provided with a jaw similar to said fixed jaw on said sleeve extending outwardly through said slot and adapted to coact with said fixed jaw, resilient means tending to hold said plunger means outwardly in said sleeve, means for locking said plunger in certain relative positions in said sleeve and means for clamping said attachment on said micrometer anvil.

6. In a device of the class described, a sleeve member provided with a socket in one side near one end adapted to receive a conventional micrometer frame end with its anvil and provided with a hole in the opposite end adapted to receive the spindle of said micrometer and further provided with a slot in one side, a fixed laterally extending jaw secured to said sleeve intermediate its ends, a plunger reciprocally mounted in said sleeve provided with a jaw similar to said fixed jaw on said sleeve extending outwardly through said slot and adapted to coact with said fixed jaw, resilient means tending to hold said plunger means outwardly in said sleeve, means for locking said plunger in certain relative positions in said sleeve, means for clamping said attachment on said micrometer anvil and means for guiding said resilient means.

7. In a caliper attachment for outside micrometer calipers, a sleeve provided with a socket portion near one end adapted to receive the fixed anvil end of the yoke of a pair of outside micrometer calipers and provided with a fixed extended jaw on one side thereof, and further provided with a slot in alinement with said jaw extending to one end of the sleeve, a plunger reciprocally mounted in said sleeve and adapted for cooperation with the spindle of said outside micrometer calipers and provided with a similarly extending jaw extending out through said slot, and means for locking said plunger in certain positions in said sleeve.

8. In a caliper attachment for outside micrometer calipers, a sleeve provided with a socket portion near one end adapted to receive the fixed anvil end of the yoke of a pair of outside micrometer calipers and provided with a fixed extended jaw on one side thereof, and further provided with a slot in alinement with said jaw extending to one end of the sleeve, a plunger reciprocally mounted in said sleeve and adapted for cooperation with the spindle of said outside micrometer calipers and provided with a similarly extending jaw extending out through said slot, means for locking said plunger in certain positions in said sleeve, an adjustable screw anvil fitted in said sleeve at one end of said socket portion, and a clamp screw on the other end of said socket in said sleeve.

9. In a caliper attachment for outside micrometer calipers, a sleeve provided with a socket portion near one end adapted to receive the fixed anvil end of the yoke of a pair of outside micrometer calipers and provided with a fixed extended jaw on one side thereof, and further provided with a slot in alinement with said jaw extending to one end of the sleeve, a plunger reciprocally mounted in said sleeve and adapted for cooperation with the spindle of said outside micrometer calipers and provided with a similarly extending jaw extending out through said slot, means for locking said plunger in certain positions in said sleeve, an adjustable screw anvil fitted in said sleeve at one end of said socket portion, a clamp screw on the other end of said socket in said sleeve and a collar secured on the opposite end of said sleeve.

10. In a caliper attachment for outside micrometer calipers, a sleeve provided with a socket portion near one end adapted to receive the fixed anvil end of the yoke of a pair of outside micrometer calipers and provided with a fixed extended jaw on one side thereof and further provided with a slot in alinement with said jaw extending to one end of the sleeve, a plunger reciprocally mounted in said sleeve and adapted for cooperation with the spindle of said outside micrometer calipers and provided with a similarly extending jaw extending out through said slot, means for locking said plunger in certain positions in said sleeve, an adjustable screw anvil fitted in said sleeve at one end of said socket means, a clamp screw on the other end of said socket in said sleeve, a collar secured on the opposite end of said sleeve and resilient means in engagement with said plunger tending to hold said plunger outwardly in said sleeve.

EDWIN MAYMAN.